(12) United States Patent
Reznichenko et al.

(10) Patent No.: US 6,229,650 B1
(45) Date of Patent: May 8, 2001

(54) OPTICAL IMAGING HEAD HAVING A MULTIPLE WRITING BEAN SOURCE

(75) Inventors: Yakov Reznichenko, Newton; Henry A. Kelley, Woburn, both of MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/420,276

(22) Filed: Oct. 18, 1999

(51) Int. Cl.$^7$ ............................ G02B 27/46; G02B 27/44; G02B 26/02; G02B 26/00; B41J 2/385

(52) U.S. Cl. ................ 359/566; 359/558; 359/562; 359/231; 359/230; 359/247; 359/290; 359/572; 359/224; 347/135; 347/241

(58) Field of Search ................................ 359/558, 562, 359/565, 566, 245, 246, 279, 251, 252, 223, 224, 231, 230, 291, 900; 355/71; 347/135, 255

(56) References Cited

U.S. PATENT DOCUMENTS

| | | | |
|---|---|---|---|
| 4,724,467 | * 2/1988 | Yip et al. | 355/71 |
| 4,786,918 | 11/1988 | Thornton et al. | 346/108 |
| 4,872,743 | 10/1989 | Baba et al. | 350/353 |
| 5,521,748 | 5/1996 | Sarraf | 359/321 |
| 5,802,034 | 9/1998 | Gelbart | 369/102 |
| 5,900,981 | 5/1999 | Oren et al. | 359/619 |
| 5,991,065 | * 11/1999 | Nutt et al. | 359/245 |
| 6,147,789 | * 11/2000 | Gelbart | 359/231 |

OTHER PUBLICATIONS

"Calibration of a Scanned Linear Grating Light Valve™ Projection System" by R.W. Corrigan et al., paper presented at Society for Information Display Symposium, May 18, 1999, San Jose, CA.

"Optical Performance of the Grating Light Valve Technology" by David T. Amm et al., paper presented at Photonics West–Electronic Imaging, Jan. 27, 1999, San Jose, CA.

"Grating Light Valve™ Technology for Projection Displays" by R.W. Corrigan et al,., paper presented at the International Display Workshop, Kobe, Japan, Dec. 9, 1998.

"Scanned Linear Architecture Improves Laser Projectors" by Robert W. Corrigan, internet article in Laser Focus World (www.optoelectronics–world.com), Jan. 1999, pp. 169 et seq.

(List continued on next page.)

*Primary Examiner*—Audrey Chang
(74) *Attorney, Agent, or Firm*—Robert A. Sabourin

(57) ABSTRACT

A method for transferring an image to a medium includes: generating a substantially uniform line of radiation; producing diffractive light from the uniform line of radiation; passing zero order diffractive light to the medium in a telecentric fashion while blocking non-zero order diffractive light; adjusting image magnification on the medium independent of image focus in response to the zero order diffractive light; and adjusting image focus on the medium independent of image magnification in response to the zero order magnification-adjusted diffractive light. An optical imaging head for transferring an image onto a medium via the above method includes: a line illumination module for generating a substantially uniform line of radiation; a grating light valve which receives the line of radiation and generates diffractive orders of modulated radiation; a first lens group for adjusting image magnification independent of image focus; a second lens group for passing radiation to the medium in a telecentric fashion, the second lens group adjusting image focus independent of image magnification; and a stop, placed between the first and second lens groups, having a single aperture for passing zero order radiation and blocking non-zero order radiation.

15 Claims, 3 Drawing Sheets

OTHER PUBLICATIONS

"Speed Exploited in Grating Light Valve Scheme" in Electronic Engineering Times, Jul. 6, 1998, pp. 51–52.

"The Grating Light Valve: revolutionizing display technology" by D.M. Bloom SPIE paper, Feb. 10–12, 1997, San Jose, CA.

"Grating Light Valve™ Technology: Update and Novel Applications" by D.T. Amm et al., a paper presented at Society for Information Display Symposium, May 19, 1998, Anaheim, CA.

* cited by examiner

OPTICAL IMAGING HEAD HAVING A MULTIPLE WRITING BEAN SOURCE

BACKGROUND OF THE INVENTION

1. Field of the Invention

The invention relates generally to an improved optical imaging head for use in transferring images to a recording medium, and more particularly, to a dual telecentric, high powered optical imaging head operating with zero order diffractive radiation in an external drum imagesetter.

2. Description of the Prior Art

With any image to be printed in the printing industry, a typical first step in the overall process is prepress operations, that is, to transform digital information representing the image of interest onto a light or thermal sensitive medium, e.g. a printing plate, which is then used to transfer the image any number of times on a printing press. As prepress technologies have evolved, the time required to create the image has been reduced while the quality of the image has improved. Also evolving is the media used for film, plates, proofing and final production. This evolution continues to drive the requirement for a faster, higher quality, imaging system capable of imaging on many different recording media.

One method for reducing imaging time is to increase the number of beams that write on the media at any one time. There exist in the art several methods for creating multiple writing beams from a single source. These previous methods include the use of a multi-channel acousto-optical modulator (AOM), various beam splitting technologies and multi-element modulators such as digital micromirror devices (DMD™ trademarked by Texas Instruments), and lanthanum modified lead zirconate titanate which can be fabricated as a transmissive ferroelectric ceramic modulator, also known as PLZTs.

A new type of multi-element modulator, the grating light valve or GLV, has recently been developed for use in the field of displays by Silicon Light Machines, Inc. of Sunnyvale, Calif. This GLV is an addressable diffraction grating, formed of moving parts on the surface of a silicon chip. Each GLV pixel consists of dual-supported parallel ribbons formed of silicon nitride and coated with a reflective aluminum top layer. Several publications are incorporated herein by reference in their entirety to provide supplemental background information on grating light valves which is not essential but is helpful in appreciating the applications of the present invention. They are: "Grating Light Valve™ Technology: Update and Novel Applications" by D. T. Amm et al., presented at Society for Information Display Symposium, May 19, 1998, Anaheim, Calif.; "Grating Light Valve™ Technology for Projection Displays" by R. W. Corrigan et al., presented at the International Display Workshop, Kobe Japan, Dec. 9, 1998, Paper Number LAD5-1; "Optical Performance of the Grating Light Valve Technology" by D. T. Amm et al., presented at Photonics West-Electronic Imaging, Jan. 27, 1999, San Jose, Calif.; and "Calibration of a Scanned Linear Grating Light Valve™ Projection System" by R. W. Corrigan et al., presented at Society for Information Display Symposium, May 18, 1999 in San Jose, Calif.

SUMMARY OF THE INVENTION

It is an object of the present invention to provide an efficient, high-powered optical imaging head for use in transferring an image to a medium.

A method for transferring an image to a medium includes: generating a substantially uniform line of radiation; producing diffractive light from the uniform line of radiation; passing zero order diffractive light to the medium in a telecentric fashion while blocking non-zero order diffractive light; adjusting image magnification on the medium independent of image focus in response to the zero order diffractive light; and adjusting image focus on the medium independent of image magnification in response to the zero order magnification-adjusted diffractive light. An optical imaging head for transferring an image onto a medium via the above method includes: a line illumination module for generating a substantially uniform line of radiation; a grating light valve which receives the line of radiation and generates diffractive orders of modulated radiation; a first lens group for adjusting image magnification independent of image focus; a second lens group for passing radiation to the medium in a telecentric fashion, the second lens group adjusting image focus independent of image magnification; and a stop, placed between the first and second lens groups, having a single aperture for passing zero order radiation and blocking non-zero order radiation.

BRIEF DESCRIPTION OF THE DRAWINGS

The aforementioned aspects and other features of the invention are described in detail in conjunction with the accompanying drawings (not drawn to scale) in which the same reference numerals are used throughout for denoting corresponding elements and wherein.

DETAILED DESCRIPTION OF THE PREFERRED EMBODIMENTS

Figure 1A:
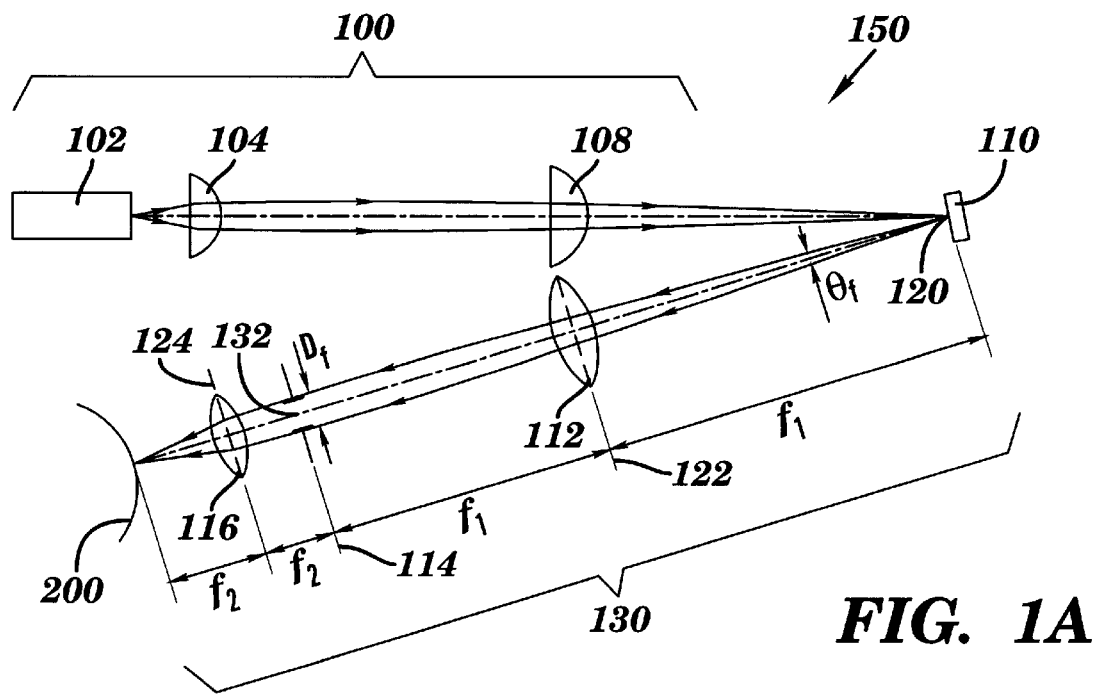
FIG. 1A is a side view optical diagram of a preferred embodiment of an imaging head built in accordance with the principles of the present invention.
Figure 1B:
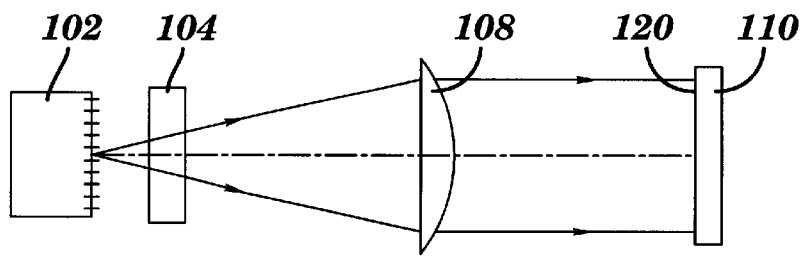
FIG. 1B is a top view optical diagram of the illumination system plus the grating light valve of the imaging head of FIG. 1A.
Figure 1C:
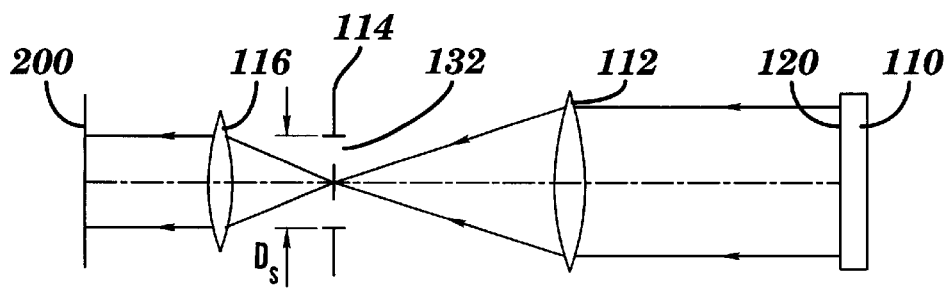
FIG. 1C is a top view optical diagram of the imaging system of the imaging head of FIG. 1A.

FIGS. 1A, 1B and 1C illustrate side and top views of a preferred structure and operation of an optical imaging head 150 which can be separated into two basic parts, the illumination system 100 and the imaging system 130. The illumination system 100 generates and emits a line of continuous wave energy. The zero order diffractive imaging system 130 receives the continuous wave energy or radiation at the object plane 120 of the GLV 110, then transfers an image via zero order diffractive radiation through various components to an imaging medium.

The illumination system 100 takes the form of a line illumination module 100 which includes a bar 102 of laser diodes for generating multiple laser beams, a fast axis collimating lens 104 for evenly dispersing the radiation in a fast axis direction and a slow axis collimating lens 108 for evenly dispersing the radiation in a slow axis direction. The laser bar 102 is a group of laser diodes which emit laser beams to the fast axis collimating lens 104. The slow axis direction corresponds to the movement of the optical head along the longitudinal axis of an imaging drum which parallels the linear direction along the width W (see FIG. 2) of the medium 200, whereas the fast axis direction corresponds to the spinning of a laser beam along the radial direction of the drum, e.g. along a swath (N) of the medium 200.

The type of light source used is dependent upon the particular media. In the preferred embodiment, the medium 200 is thermally sensitive, so an appropriate laser light source is used for imaging on that media. However, other sources of electromagnetic energy could be used, as necessary, for various applications.

Figure 2A:
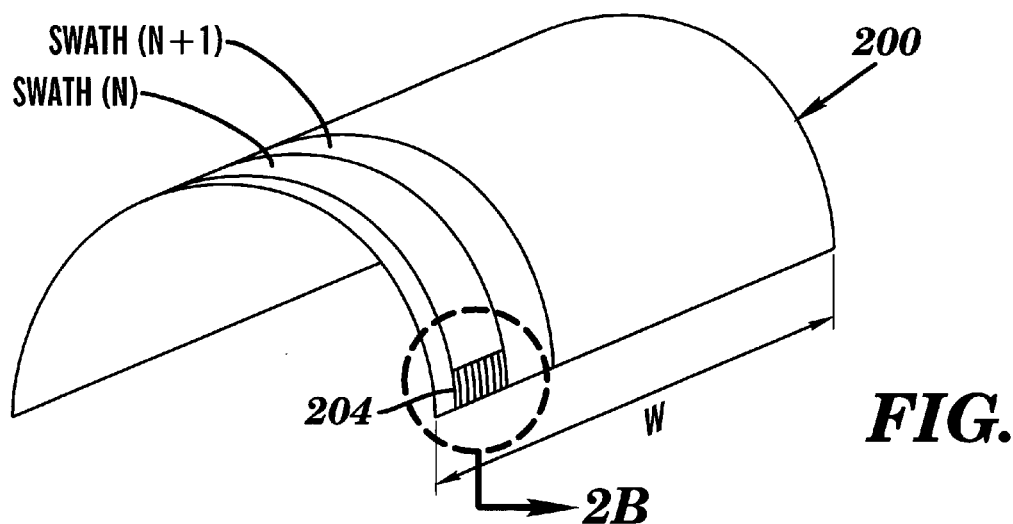
FIG. 2 perspective view of an image medium positioned for imaging on an external drum and recorded upon by the imaging head of FIG. 1A.
Figure 2B:
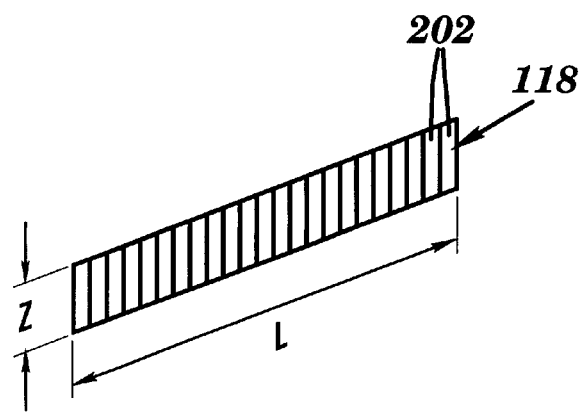

The medium 200, shown in FIG. 2, is positioned as supported on an external drum (not shown). A line of illumination 118 (also referred to as a line of radiation), which is coincident with the medium 200 at the image plane, has a length L and a width Z. Each line of illumination 118 contains a predetermined number of sections 202 which, respectively, correspond to some number of pixels on the GLV 110. The line of illumination 118 is imaged at an initial position 204 along a first swath (N) on the sheet of medium 200. As the drum rotates, pixels along the line of illumination 118 are turned ON or OFF according to image information supplied by control electronics as well known in the art. Modulation of pixels is synchronized to the rotational speed of the drum. This procedure continues until imaging is complete on swath (N). The movement of the line of illumination 118 from swath (N) to (N+1) is facilitated by movement of the imaging head along the longitudinal axis (i.e. the slow axis) of the rotating drum. Then, the above-described imaging procedure is repeated for swath (N+1) and all additional swaths until the image is completely transferred onto the medium 200. The imaging procedure could also be accomplished by other means such as a spiral scan of the media as well known in the art.

The GLV operates by diffracting light with the use of moveable ribbons in an array. For the present invention, energy from the GLV reaches the image plane when a GLV pixel is not activated. When a pixel is fully activated, i.e. when alternate ribbons are deflected approximately one-quarter wavelength, then light is diffracted and subsequently blocked from reaching the image plane. Pixels may be partially activated to control the amount of light reaching the image plane.

One exemplary GLV consists of 1088 individually addressable pixels. In the preferred embodiment a one-dimensional GLV array is used, although a two dimensional GLV could be used if desired to create an area of illumination rather than a line of illumination.

Various imaging resolutions are available by changing the grouping of the GLV pixels. Also, all pixels of the GLV need not necessarily be used in the formation of an image. For example, if 720 GLV pixels are imaged one-for-one at the image plane to produce a resolution of 2400 image pixels (i.e. writing dots) per inch, then a grouping of two GLV pixels per image plane pixel results in 360 writing dots at a resolution of 1200 dots per inch.

No additional moving parts are required to change spot size (i.e. the writing dots or image pixels) other than to select the number of GLV pixels for the desired resolution. Moreover, with constant illumination of the GLV, the energy at the image plane remains constant in terms of energy per unit area, thereby requiring no exposure energy changes with change in resolution. This provides a benefit over systems using optical demagnification to change addressability. With optical demagnification, the power in the imaging spot must be reduced proportionally to the change in spot size causing more power to be discarded and slowing down the system by the same proportion. In the preferred system, throughput remains constant as the power is spread over proportionally more pixels. Other combinations of ribbons can be selected on the GLV with the appropriate demagnification selection. In each case the time of activation of each pixel is varied directly with the resolution selected while the scanning velocity remains constant.

The imaging system 130 includes the grating light valve 110, a first magnification lens group 112, a stop 114 containing an aperture 132, and a second focusing lens group 116. The grating light valve used here allows each pixel 202 to be separately and individually controlled in accordance with signals from control electronics built into the GLV modulator 110. In other words, individual image pixels 202 can be separately diffracted. Furthermore, the intensity of each GLV pixel can be electronically controlled by varying the voltage applied to the ribbons, thus controlling their deflection and ultimately the amount of energy that reaches the image plane. Varying the intensity of GLV pixels on the GLV object plane 120 can correct non-uniformity of the line of illumination on the image plane.

Figure 3:
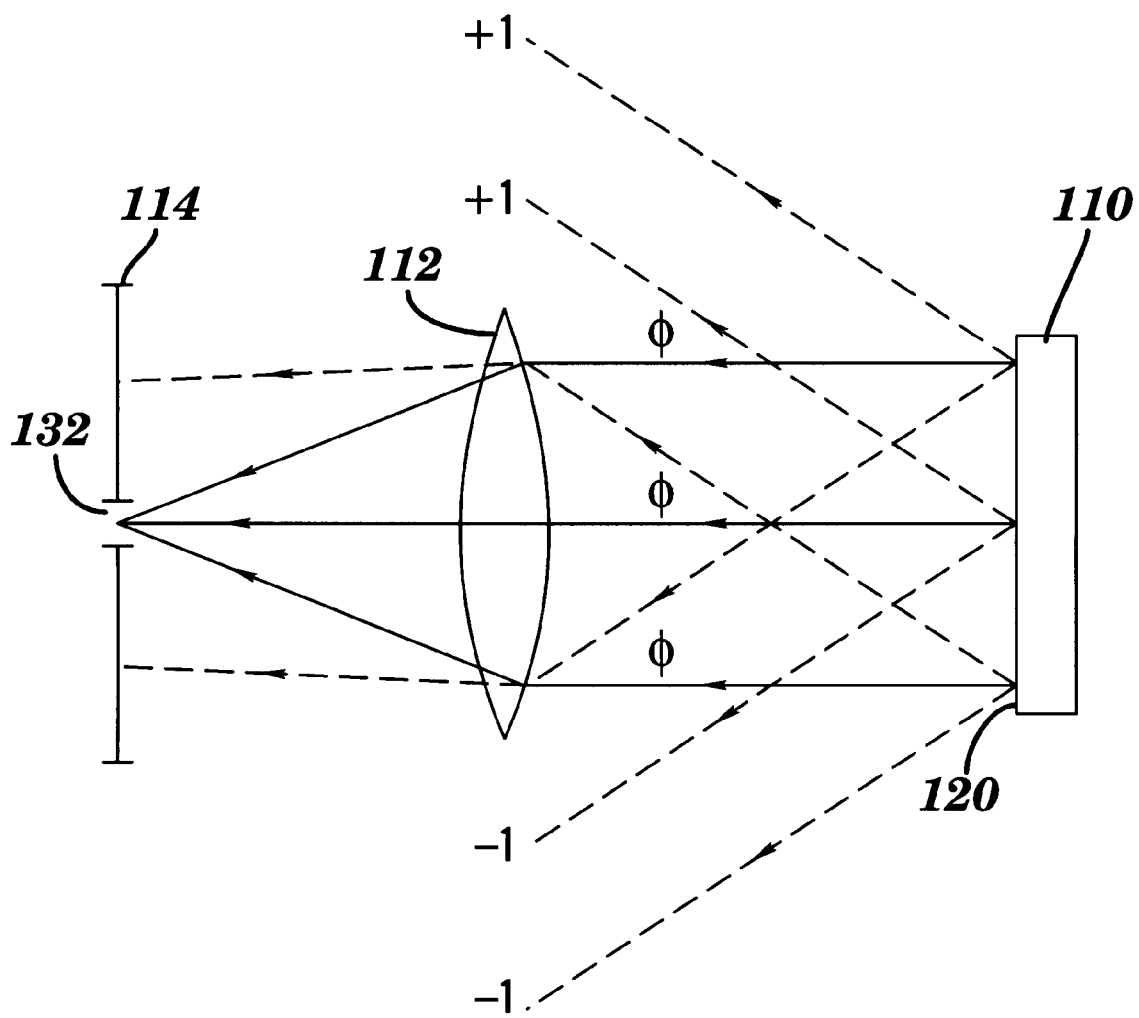
FIG. 3 is a diagram which illustrates zero and first order diffractive rays traversing between selected components of the imaging head of FIG. 1A.

The surface 120 of the grating light valve 110 includes a diffraction grating, i.e. an array of narrow parallel slits or openings which, when white light is projected therethrough, breaks down the white light into all the colors of the spectrum due to the diffraction of light waves as they pass through the openings. The diffraction grating produces this spectral effect due to the reinforcement of the light waves from adjacent slits or openings. FIG. 3 illustrates the effect of the diffraction grating surface 120 on white light received from the light source 102.

Turning to FIG. 3, selected components of the imaging head 150 of FIG. 1A are depicted to illustrate diffraction of light from the surface 120 of the grating light valve 110. Zero order diffracted light is represented by solid lines whereas, positive and negative first order diffracted light is represented by dotted lines. Higher diffractive orders are omitted for simplicity.

Figure 1D:
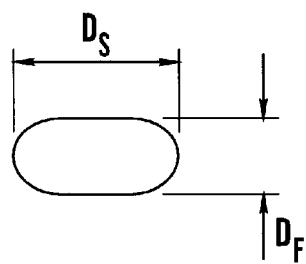
FIG. 1D is a diagram of a preferred aperture of elliptical shape for use in the imaging head of FIG. 1A.

The zero order diffracted light reflected from the object plane 120 of the GLV 110 passes through the first lens group 112 and is directed to, and passes through, the aperture 132. The first lens group 112 includes at least one fixed lens and at least one adjustable lens for adjusting the image magnification independent of the image focus. The aperture 132 is a single centrally located opening (preferably having an elliptical shape as shown in FIG. 1D) on the stop 114. The stop 114 blocks non-zero order diffractive rays while allowing zero order diffractive rays to pass through the aperture 132.

The principal rays of zero order radiation received from the first lens group 112 are focused in the center of the aperture 132, and passed to the second lens group 116 (see FIG. 1C). The second lens group 116 includes one or more lenses for adjusting the image focus independent of the image magnification. The second lens group 116 must contain at least one adjustable lens, and could contain zero, one or more fixed lenses. From the second lens group 116, the rays are focused along a line of radiation 118 (see FIG. 2) on the imaging medium 200.

When compared to the use of higher order diffracted light, the use of zero order diffracted light in the present invention produces several benefits. Depth of focus is reduced. Also, the optical design is simplified since only a single aperture is used to pass zero order diffracted light. In contrast, multiple apertures and additional optical components are required for passing higher order diffracted light. Additional lens groups are required to collect first or higher order diffracted light. Furthermore, using zero order diffracted light increases resolution while concurrently improving image quality. No significant grey scale adjustment is necessary for imaging with zero order diffracted light.

One drawback that a zero order diffraction system has when compared to a first order diffraction system is lower contrast ratio and dynamic range. However, the thermal media used for the preferred digital imaging embodiment is not sensitive to these parameters.

The optical layout of the imaging system 130 as illustrated in FIG. 1A will separate the various diffractive orders of the radiation received from the illumination system 100. Specifically, the size of the elliptical opening 132 (shown in FIG. 1D) is calculated as, $$D_f = (-\Theta_f * f_1) \tag{1}$$

$$D_s = (-\Theta_s * f_1) \tag{2}$$

where:
- $f_1$ is the focal length of the first (magnification control) lens group 112;
- $\Theta_f$ is the diverging angle of the line of radiation in the fast axis direction from the GLV (see FIG. 1A);
- $\Theta_s$ is the diverging angle of the line of radiation in the slow axis direction from the GLV (see FIG. 1C);
- $D_f$ is the diameter of the ellipse in the fast axis direction; and
- $D_s$ is the diameter of the ellipse in the slow axis direction.

In the given optical system, the aperture is positioned to be at a distance equivalent to the focal length $f_1$ of the first lens group 112 away from the principal plane of the first lens group 122. Maintaining the distance between the first lens group 112 and the object plane 120 of the modulator 110 is important for cleanly separating the diffractive orders.

One embodiment of the present invention includes a dual telecentric imaging system. Telecentricity occurs when rays are normal to an incident surface. Prior art imaging systems sometimes exhibit singular telecentricity of the rays at the imaging plane. The benefit of having an imaging system with dual telecentricity is to separate diffractive orders and separate magnification adjustments from focusing adjustments.

The imaging system 130 of the optical head 150 is shown in a dual telecentric arrangement. The imaging system is comprised of two lens groups, first lens group 112 and second lens group 116. Lens group 112 has an effective focal length equal to $f_1$ and lens group 116 has an effective focal length equal to $f_2$. Dual telecentricity is achieved when the perpendicular distance between the principal planes of lens groups 112 and 116 is equal to $f_1+f_2$, and the aperture 132 is positioned at a common focal plane, i.e. where the aperture is a distance $f_1$ from the first lens group 122 and a distance $f_2$ from the second lens group 116. With a dual telecentric arrangement, magnification of the system is insensitive to movements of the GLV 110 or imaging medium 200.

Another advantage of the given optical system is that either magnification or focus can be adjusted independent of one another. With lens group 112 positioned a distance $f_1$ from the object plane 120, lens group 116 positioned a distance $f_2$ from the image plane 200 and the distance between first and second lens groups to be the distance $f_1+f_2$, the ratio $(f_2/f_1)$ sets the magnification of the imaging system 130. The magnification is adjusted by moving one or more elements of the first lens group 112. The focus of the system is adjusted by moving one or more elements of the second lensgroup 116.

Every emitter of the diode bar 102 illuminates the entire object plane 120 of the GLV 110. This provides an advantage in that the energy distribution across the object plane 120 is smoothed by the contributions from each diode. The long, matched focal lengths of the illumination system 100 have the effect of reducing the divergence of the energy reflected from the GLV 110, which, in turn, improves the depth of focus of the imaging system 130.

One could alter the system illustrated in FIG. 1A to write using first order diffractive rays while blocking zero order diffractive rays. Similarly, the system could be designed to operate with either even or odd order diffractive light. Also variable is the ratio of pixels in the GLV to pixels on the image plane. In the preferred embodiment, each pixel on the image plane corresponds to two GLV pixels.

The optical imaging head 150 is preferably used with an external drum imagesetter or platesetter, so that the image is transferred onto a medium supported by the external surface of the drum. The optical imaging head 150 could also be used in direct-to-press imaging to project the line of illumination 118 directly onto a plate cylinder of a printing press. In this case, the head would be replicated at each station of the printing press. Furthermore, while the head is most appropriately used in the above-described applications, it may also be used in an internal drum or capstan style imagesetter or platesetter.

Due to the fact that a large number of pixels is used to create the GLV 110, it is possible to advantageously employ some number of pixels for uses other than as writing beams without incurring a penalty. These other uses include sourcing beams (1) to detect the edge of a plate so as to synchronize the image location with the position of the recording medium, or (2) to sense or to automatically adjust the focus of an imaging system.

The fact that individual GLV pixels may be actuated to different levels of diffraction efficiency can be used to great advantage. A first possible use is to equalize the energy distribution across the GLV. If a nominal energy level is set below the maximum, then individual pixels can be adjusted either up or down to cause all pixels to be equal. A second use is to desensitize the effects of pixel placement errors at the boundary between bands of multiple pixels. The pixels located at the boundary between the swaths of multiple pixels can be lowered in intensity and overlapped so as to average the effective position.

There are other advantages of using the above-described GLV in an optical imaging head. For instance, manufacture of the GLV is cost effective compared with manufacture of other light modulators since the fabrication of the GLV uses standard fabrication methods employed in the semiconductor industry. Also, the pixels of the GLV are accurately located to tight semiconductor standards. The GLV is capable of modulating high power levels of radiation. Moreover, the reflective GLV results in a more compact system as compared to an in-line multiple beam system. A transmissive modulator could be used to replace the GLV, but one of the trade-offs would be a physically larger system. Due to the scale and materials employed, the GLV is inherently insensitive to damage from shock and vibration. The GLV is also sealed and insignificantly stressed in use, resulting in high reliability. Due to the fact that the GLV pixels can be pulled down to different levels, the GLV can be used with different wavelength sources. The GLV can also be used with both multi-mode and single mode lasers. Further, as compared to single beam methods of writing images, the adjacency of the pixels produced by the GLV reduces the power required to write equivalent images.

The above-described embodiments are merely illustrative of the present invention and represent a limited number of the possible specific embodiments devised from the principles of the invention as claimed.

What is claimed is:

1. An optical imaging head for transferring an image onto a printing plate mounted on a drum surface of an internal drum platesetter or an external drum platesetter, the optical imaging head comprising:
   a line illumination module for generating a substantially uniform line of radiation, said line illumination module comprises a bar of laser diodes, a fast axis collimating lens for evenly dispersing radiation in a fast axis direction, and a slow axis collimating lens for evenly dispersing the radiation in a slow axis direction;
   a grating light valve, forming an object plane, which receives the line of radiation from the line illumination module and generates diffractive orders of modulated radiation, said grating light valve comprising (i) an addressable diffraction grating formed of moving parts on the surface of a silicon chip, and (ii) pixels of dual-supported parallel ribbons formed of silicon nitride and coated with a reflective aluminum top layer;
   a first lens group for receiving the modulated radiation and for adjusting image magnification independent of image focus;
   a second lens group for receiving and passing the magnification-adjusted modulated radiation from the first lens group to the printing plate, said second lens group adjusting image focus independent of image magnification; and
   a stop, placed between the first and second lens groups, having a single aperture for (i) passing zero order diffractive magnification-adjusted modulated radiation to the printing plate mounted on the drum surface of the internal drum platesetter or the external drum platesetter, and (ii) blocking non-zero order diffractive magnification-adjusted modulated radiation from incidence with the printing plate mounted on the drum surface of the internal drum platesetter or the external drum platesetter.

2. The optical imaging head of claim 1 wherein the aperture is elliptical.

3. The optical imaging head of claim 1 having dual telecentricity wherein a focal length of the first lens group is $f_1$, the distance between a principal plane of the first lens group and the stop is $f_1$, a focal length of the second lens group is $f_2$, a distance between the stop and a principal plane of the second lens group is $f_2$, and a perpendicular distance between the principal planes of the lens groups is equal to $f_1+f_2$.

4. The optical imaging head of claim 1 wherein the grating light valve includes control electronics to separately diffract individual sections of the line of radiation in accordance with the image.

5. The optical imaging head of claim 4 wherein the control electronics varies grating light valve pixel intensities on the object plane to correct non-uniformities in the image.

6. The optical imaging head of claim 1 wherein the first lens group comprises one or more fixed lenses and one or more adjustable lenses for adjusting the magnification of the image independent of the focus.

7. The optical imaging head of claim 1 wherein the second lens group comprises at least one adjustable lens for adjusting the focus of the image independent of the magnification.

8. A method for transferring an image to a printing plate on an internal drum platesetter or an external drum platesetter, the method comprising:
   generating a substantially uniform line of radiation in a line illumination module comprising a bar of laser diodes, a fast axis collimating lens for evenly dispersing radiation in a axis direction;
   producing diffractive light from the uniform line of radiation using a grating light valve comprising (i) an addressable diffraction grating formed of moving parts on the surface of a silicon chip, and (ii) pixels of dual-supported parallel ribbons formed of silicon nitride and coated with a reflective aluminum top layer;
   passing zero order said diffractive light to the printing plate while blocking non-zero order said diffractive light from incidence with the printing plate;
   adjusting image magnification on the printing plate independent of image focus in response to the zero order said diffractive light; and
   adjusting image focus on the printing plate independent of image magnification in response to the zero order magnification-adjusted diffractive light.

9. The method of claim 8 further comprising varying pixel intensities on the diffractive grating surface to correct non-uniformities in the image.

10. The method of claim 8 wherein a focal length of a first lens group is $f_1$, a distance between a principal plane of the first lens group and a stop is $f_1$, a focal length of a second lens group is $f_2$, a distance between the stop and a principal plane of the second lens group is $f_2$, and a perpendicular distance between the principal planes of the lens groups is equal to $f_1+f_2$.

11. The method of claim 8 wherein the printing plate is thermally sensitive or photosensitive.

12. An optical imaging head for use on a printing press to transfer an image directly onto a plate cylinder of the printing press, the optical imaging head comprising:
   a line illumination module for generating a substantially uniform line of radiation, said line illumination module comprises a bar of laser diodes, a fast axis collimating lens for evenly dispersing radiation in a fast axis direction, and a slow axis collimating lens for evenly dispersing the radiation in a slow axis direction;
   a grating light valve, forming an object plane, which receives the line of radiation from the line illumination module and generates diffractive orders of modulated radiation, said grating light valve comprising (i) an addressable diffraction grating formed of moving parts on the surface of a silicon chip, and (ii) pixels of dual-supported parallel ribbons formed of silicon nitride and coated with a reflective aluminum top layer;
   a first lens group for receiving the modulated radiation and for adjusting image magnification independent of image focus;
   a second lens group for receiving and passing the magnification-adjusted modulated radiation from the first lens group to the medium in a telecentric fashion, said second lens group adjusting image focus independent of image magnification; and
   a stop, placed between the first and second lens groups, having a single aperture for (i) passing zero order diffractive magnification-adjusted modulated radiation to the plate cylinder of the printing press, and (ii) blocking non-zero order diffractive magnification-adjusted modulated radiation from incidence with the plate cylinder of the printing press.

13. The optical imaging head of claim 12 having dual telecentricity wherein a focal length of the first lens group is $f_1$, the distance between a principal plane of the first lens group and the stop is $f_1$, a focal length of the second lens group is $f_2$, a distance between the stop and a principal plane of the second lens group is $f_2$, and a perpendicular distance between the principal planes of the lens groups is equal to $f_1+f_2$.

14. A method for transferring an image directly onto a plate cylinder of a printing press, the method comprising:
   generating a substantially uniform line of radiation in a line illumination module comprising a bar of laser diodes, a fast axis collimating lens for evenly dispersing radiation in a fast a direction, and a slow axis colimating lens for evenly dispersing the radiation in a slow axis direction;
   producing diffractive light from the uniform line of radiation using a grating light valve comprising (i) an addressable diffraction grating formed of moving parts on the surface of a silicon chip, and (ii) pixels of dual-supported parallel ribbons formed of silicon nitride and coated with a reflective aluminum top layer;
   passing zero order said diffractive light to the plate cylinder while blocking non-zero order said diffractive light from incidence with the plate cylinder;
   adjusting image magnification on the plate cylinder independent of image focus in response to the zero order said diffractive light; and
   adjusting image focus on the plate cylinder independent of image magnification in response to the zero order magnification-adjusted diffractive light.

15. The method of claim 14 further comprising the step of providing dual telecentricity wherein a focal length of the fist lens group is $f_1$, the distance between a principal plane of the first lens group and the stop is $f_1$, a focal length of the second lens group is $f_2$, a distance between the stop and a principal plane of the second lens group is $f_2$, and a perpendicular distance between the principal planes of the lens groups is equal to $f_1+f_2$.

* * * * *